US009267674B2

(12) United States Patent
Johnston et al.

(10) Patent No.: US 9,267,674 B2
(45) Date of Patent: Feb. 23, 2016

(54) SOLID STATE LIGHT WITH ENCLOSED LIGHT GUIDE AND INTEGRATED THERMAL GUIDE

(71) Applicant: 3M INNOVATIVE PROPERTIES COMPANY, St. Paul, MN (US)

(72) Inventors: Raymond P. Johnston, Lake Elmo, MN (US); Charles N. Devore, Hugo, MN (US); Martin J. Vos, Minneapolis, MN (US); Paul E. Humpal, Stillwater, MN (US); Robert L. Brott, Woodbury, MN (US); Kayla A. Hagens, Cottage Grove, MN (US); Hamid R. Mortazavi, Woodbury, MN (US); James F. Poch, Ellsworth, WI (US); Michael A. Meis, Stillwater, MN (US); Timothy J. Pommer, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 75 days.

(21) Appl. No.: 14/057,067

(22) Filed: Oct. 18, 2013

(65) Prior Publication Data
US 2015/0109791 A1   Apr. 23, 2015

(51) Int. Cl.
*F21V 17/16* (2006.01)
*F21V 29/00* (2015.01)
*F21V 8/00* (2006.01)
*F21K 99/00* (2010.01)
*F21V 29/10* (2015.01)
*F21Y 101/02* (2006.01)

(52) U.S. Cl.
CPC .............. *F21V 29/004* (2013.01); *F21K 9/52* (2013.01); *G02B 6/0096* (2013.01); *F21Y 2101/02* (2013.01)

(58) Field of Classification Search
CPC ....... F21K 9/52; G02B 6/0096; F21V 29/004; F21Y 2101/02
See application file for complete search history.

(56) References Cited

U.S. PATENT DOCUMENTS 7,160,012 B2   1/2007   Hilscher
7,581,856 B2   9/2009   Kang
(Continued)

FOREIGN PATENT DOCUMENTS

DE   20 2007 009 272   12/2007
EP   2025992   2/2009
(Continued)

OTHER PUBLICATIONS

"A Game Changing Technology: ITRI's Wide Angle LED Bulb", ITRI Today, The Industrial Technology Research Institute, No. 68, Spring Quarter, pp. 6-7 (2012).
(Continued)

*Primary Examiner* — Anh Mai
*Assistant Examiner* — Nathaniel Lee

(57) ABSTRACT

A solid state light having a solid state light source such as LEDs, a light guide having an enclosed interior volume such as a bulb shape without vents, and a thermal guide. The light guide is coupled to the light source for receiving and distributing light from the light source. The thermal guide is at least partially contained within the interior volume with an air gap between a portion of the thermal guide and the light guide. The thermal guide provides for thermal conduction from the light source and dissipating heat through convection and radiation for cooling the light.

20 Claims, 5 Drawing Sheets

(56) References Cited

U.S. PATENT DOCUMENTS

| | | |
|---|---|---|
| 7,607,802 B2 | 10/2009 | Kang |
| 7,708,452 B2 | 5/2010 | Maxik |
| 8,360,604 B2 | 1/2013 | Negley |
| 8,487,518 B2 | 7/2013 | Johnston |
| 8,761,565 B1 * | 6/2014 | Coleman .................. F21K 9/13 362/335 |
| 2004/0201990 A1 | 10/2004 | Meyer |
| 2005/0105302 A1 | 5/2005 | Hofmann |
| 2008/0013316 A1 | 1/2008 | Chiang |
| 2008/0253125 A1 | 10/2008 | Kang |
| 2010/0148652 A1 | 6/2010 | Vetrovec |
| 2010/0181888 A1 | 7/2010 | Lu |
| 2010/0264800 A1 | 10/2010 | Liu |
| 2011/0032708 A1 | 2/2011 | Johnston |
| 2011/0101861 A1 | 5/2011 | Yoo |
| 2011/0298371 A1 | 12/2011 | Brandes |
| 2011/0309735 A1 | 12/2011 | Parker |
| 2012/0106153 A1 | 5/2012 | Huang |
| 2012/0194054 A1 | 8/2012 | Johnston |
| 2012/0314420 A1 | 12/2012 | Yamamoto |
| 2012/0319555 A1 | 12/2012 | Nakagawa |
| 2013/0107496 A1 | 5/2013 | Bisberg |
| 2013/0113358 A1 | 5/2013 | Progl |

FOREIGN PATENT DOCUMENTS

| | | |
|---|---|---|
| WO | WO 2010-058325 | 5/2010 |
| WO | WO 2010-146746 | 12/2010 |
| WO | WO 2012-139358 | 10/2012 |

OTHER PUBLICATIONS

PCT International Search Report for PCT/US2014/058721, mailed Dec. 30, 2014.

* cited by examiner

SOLID STATE LIGHT WITH ENCLOSED LIGHT GUIDE AND INTEGRATED THERMAL GUIDE

BACKGROUND

The energy efficiency of lighting has become an important consideration in industrial, consumer, and architectural lighting applications. With the advances in solid state light technology, light emitting diodes (LEDs) have become more energy efficient than fluorescent lights. Further, the marketplace has a large established fixture base for Edison, fluorescent and high intensity discharge lights. These types of applications present a significant technical challenge for LEDs due to their inherent point source nature, and the need to operate the LEDs at relatively low temperatures. Today there are many solutions addressing these issues, including fans, thermal sinks, heat pipes and the like. However, these approaches limit the applications by adding complexity, cost, efficiency loss, added failure modes, an undesirable form factor, and light distribution. The need remains to find a solution that can provide optical and electrical efficiency and device lifetime benefits, at attractive manufacturing costs and design.

SUMMARY

A light with integrated light and thermal guides, consistent with the present invention, includes a light source, a light section, a light guide coupled to the light section, and a thermal guide. The light guide has a first surface and a second surface opposite the first surface and an edge between the first and second surfaces. The second surface forms an enclosed interior volume. The light guide is in communication to the light source for receiving and distributing light from the light source, and the light is transported within the light guide until the light exits from the first or second surface. The light source is located at the edge of the light guide in order to optically couple the light into the light guide. The thermal guide is at least partially contained within the interior volume and integrated with the light guide for providing thermal conduction from the light source for cooling the light, and there is an air gap between at least a portion of the thermal guide and the second surface of the light guide.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include an LED light bulb having a light guide with an enclosed interior volume and a thermal guide at least partially contained within the interior volume. Examples of solid state lights are described in the following, all of which are incorporated herein by reference as if fully set forth: U.S. Pat. No. 8,487,518; and U.S. Patent Applications Publication Nos. 2012/0194054 and 2011/0032708.

Figure 1:
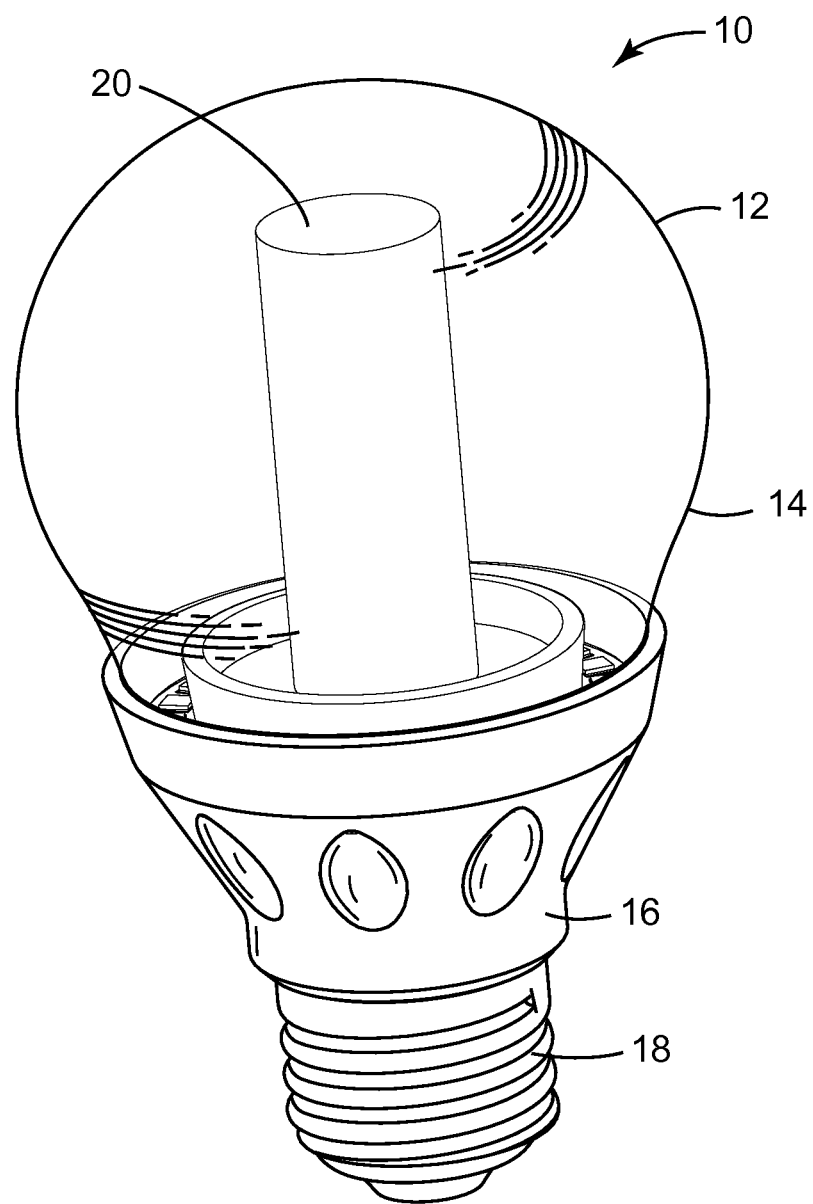
FIG. 1 is a perspective view of a solid state light, as assembled.
Figure 2:
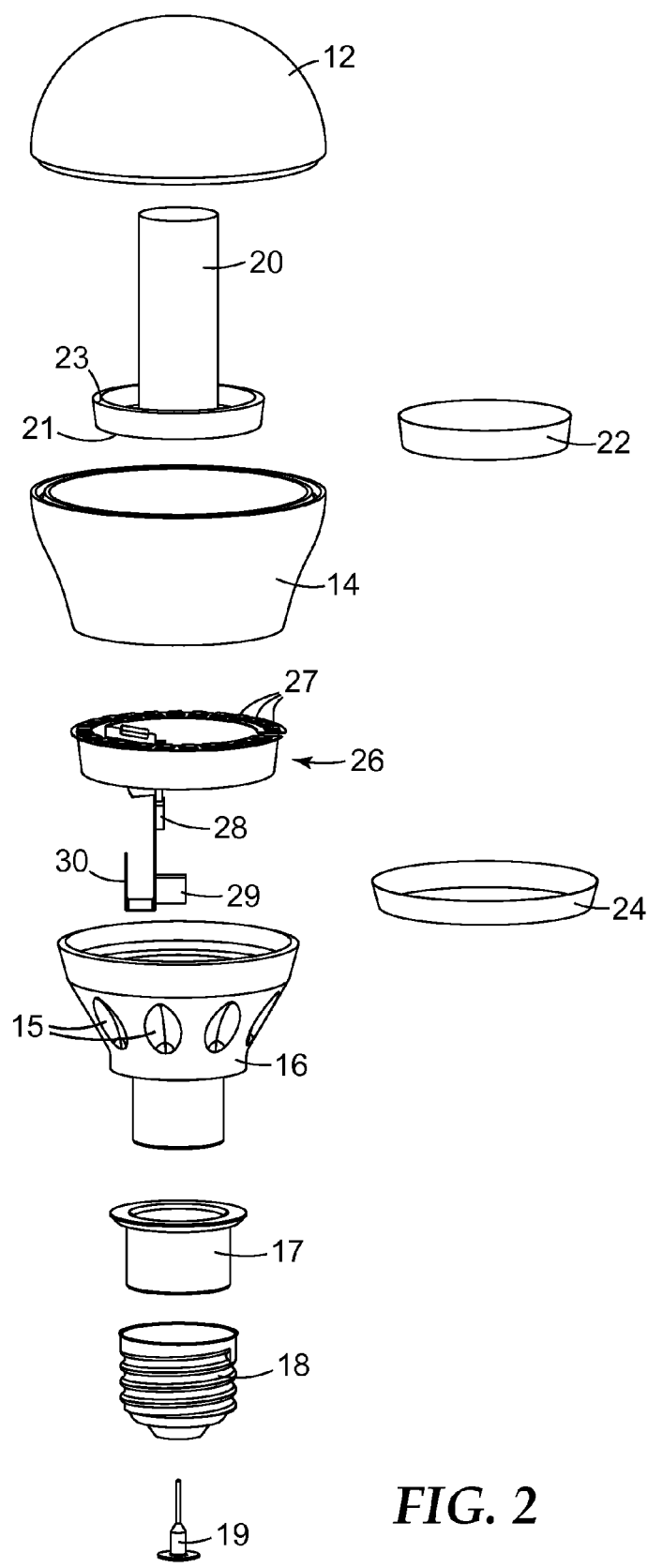
FIG. 2 is an exploded perspective view of the solid state light.
Figure 3:
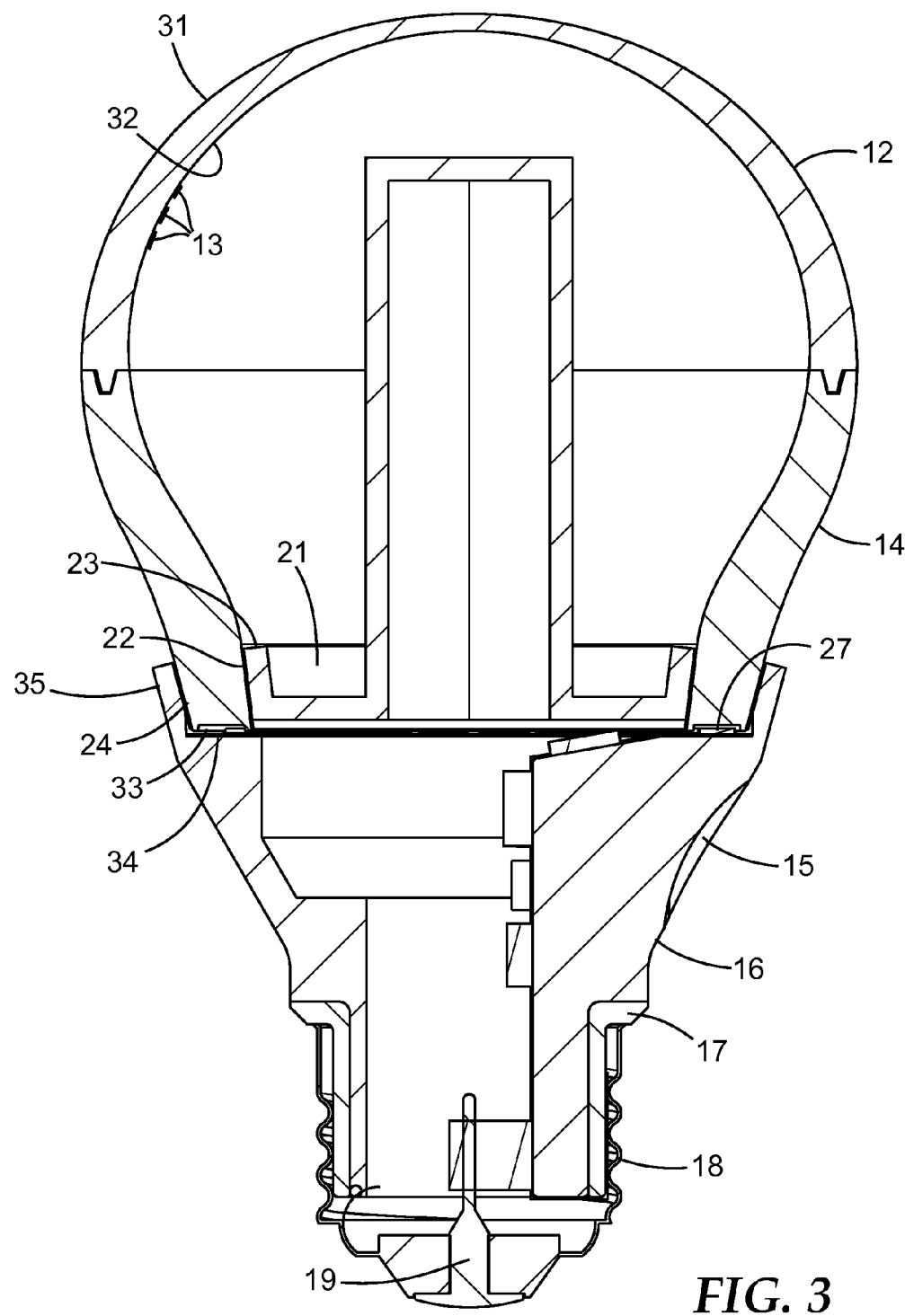
FIG. 3 is a side sectional view of the solid state light.

FIG. 1 is a perspective view of a solid state light 10, as assembled. FIGS. 2 and 3 are exploded perspective and side sectional views, respectively, of solid state light 10. Light 10 includes a light guide having an upper portion 12 and a lower portion 14, a light section 16, a base 18, and a thermal guide 20. The light guide has an outer surface 31 and an inner surface 32 forming an enclosed interior volume, meaning the light guide has no apertures (vents) allowing passage of air through the light guide to the interior volume. The outer and inner surfaces 31 and 32 form an edge 33. Inner surface 32 can optionally have light extraction features, as represented by features 13, in order to provide for a uniform or particular light distribution from the light guide. Light extraction features 13 can include, for example, a printed pattern of dots or other shapes on inner surface 32. Providing light extraction features 13 on only inner surface 32 can provide light 10 with a smooth appearance and feel on outer surface 31 of the light guide.

A circuit board 26 includes a plurality of light sources 27, a driver circuit 28 such as an integrated circuit chip, a connector 29, and a neutral pad 30. Light sources 27 are located at an edge, for example edge 33, of the light guide formed by outer and inner surfaces 31 and 32 in order to optically couple light into the light guide. The light is transported in the light guide, for example by total internal reflection, until the light is extracted from outer surface 31, inner surface 32, or both. Connector 29 is electrically connected with a pin 19 in order to receive power from a power source such as a light socket. Neutral pad 30, optionally with a neutral clip, is electrically connected with base 18.

Light section 16 includes a ridge 34 for supporting light sources 27 and a portion 35 for supporting outer surface 31 of the light guide adjacent edge 33. In some embodiments, there is no air gap between edge 33 and light sources 27. For example, edge 33 can be placed directly against light sources 27, or an optical adhesive can be between edge 33 and light sources 27. Reflective rings 22 and 24 can be located adjacent light sources 27 and on opposite sides of them in order to help couple light from light sources 27 into the light guide. Reflective rings 22 and 24 can be implemented with a reflective film. An example of a reflective film is the Enhanced Specular Reflective (ESR) film product from 3M Company, St. Paul, Minn. An insulator 17 is located between light section 16 and base 18. In some embodiments, light section 16 has no apertures (vents) between the light guide and base 18 (see FIG. 1). Light section 16 can optionally include decorative facets or indentations 15 on its exterior surface.

Thermal guide 20 is at least partially contained within the interior volume of the light guide for providing thermal conduction from the light sources 27 for cooling the light. Thermal guide 20 has a base 21 for placement within light section 16 and a portion 23. Thermal guide 20 can extend by varying or different amounts into the interior volume of the light guide, for example it can extend only slighting into the interior volume or extend nearly through the interior volume or extend by other amounts. The thermal guide can have mechanical interference with the light guide to hold the light guide on light section 16. In particular, portion 23 can be angled slightly toward the light guide in order to hold the light guide in place against portion 35 of light section 16. In some embodiments, portions 23 and 35 may have ribs or protrusions to maintain a slight gap between light guide lower portion 14 and reflective rings 22 and 24. Alternatively, ribs or protrusions can be placed on surfaces 31 and 32 to maintain a slight air gap between light guide lower portion 14 and reflective rings 22 and 24. Thermal guide 20 can enclose the interior volume of the light guide between the light guide and light section 16, in which case the interior volume is fully enclosed to prevent passage of air (and moisture or particulate) from outside the light into the interior volume. For example, base 21 along with the post extending into the interior volume of the light guide can both be implemented without apertures (vents), and base 21 can provide for a perimeter seal against inner surface 32 of the light guide. An air gap is formed between at least a portion of thermal guide 20 and inner surface 32 the light guide. In some embodiments, the air gap substantially surrounds thermal guide 20 between thermal guide 20 and inner surface 32 of the light guide (see FIG. 2).

Figure 4:
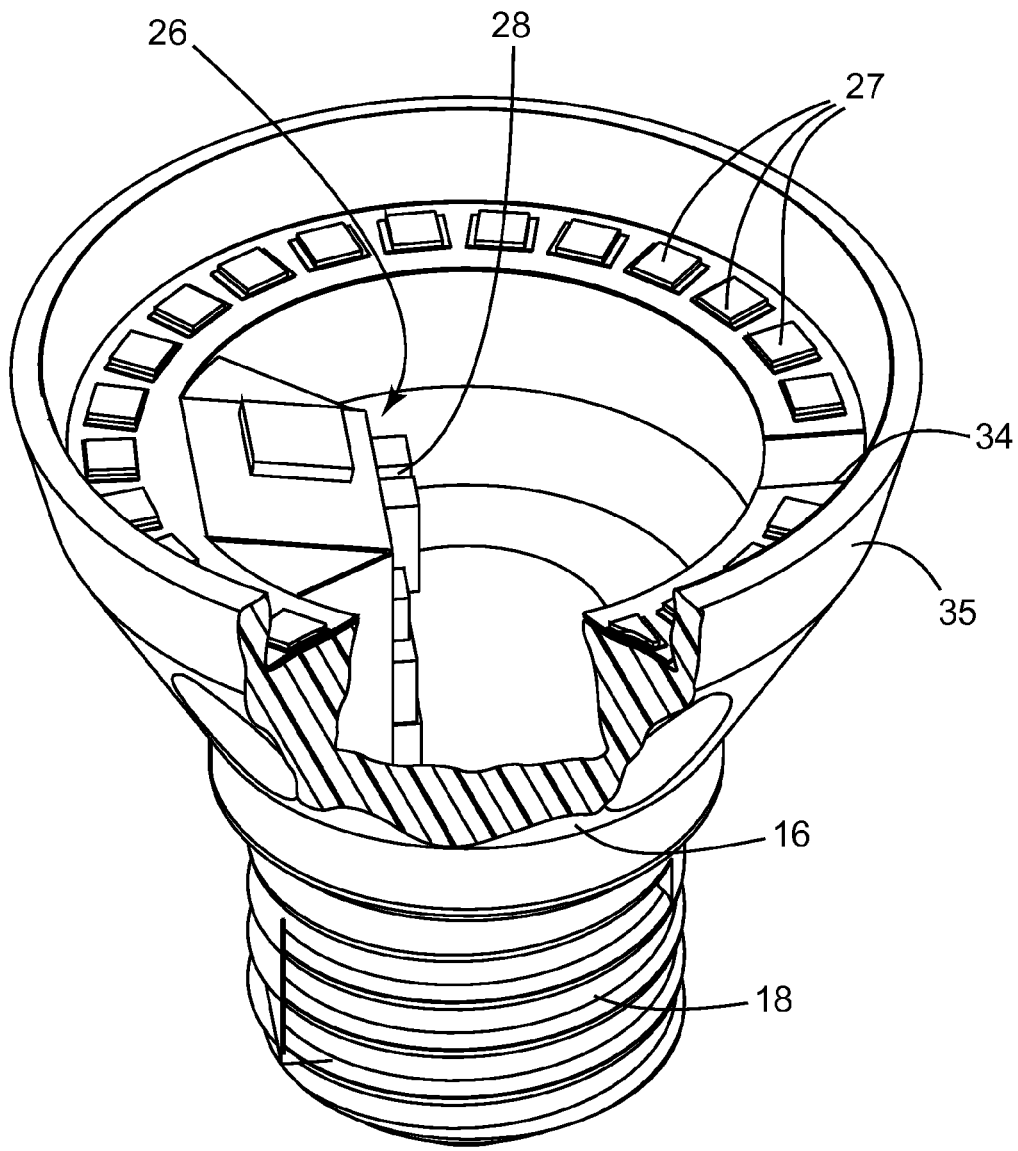
FIG. 4 is a perspective view of the light section for the solid state light and illustrating LEDs on a flexible circuit board installed within the light section.
Figure 5:
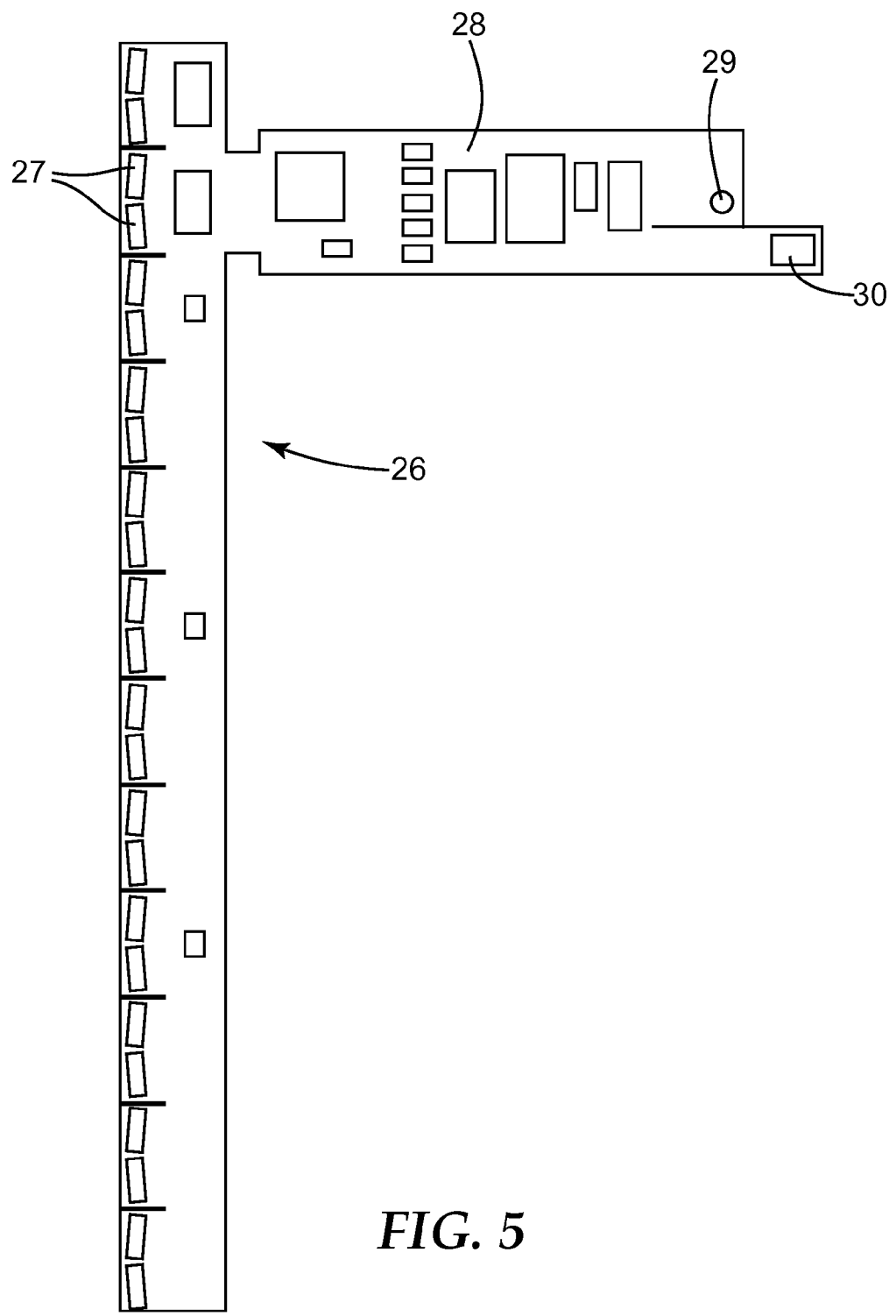
FIG. 5 is a diagram of the flexible circuit board before installation in the light section of the solid state light.

FIG. 4 is a perspective view of light section 16 for solid state light 10 and illustrating LEDs on circuit board 26 installed within light section 16. FIG. 5 is a diagram of circuit board 26 before installation in light section 16. In some embodiments, circuit board 26 can be implemented with a flexible one-piece material and folded for installation within light section 16. The portion of circuit board 26 with light sources 27 can be folded onto ridge 34. The portion of circuit board 26 containing driver circuit 28 can be folded to extend into an interior of light section 16. The portion of circuit board 26 containing connector 29 can be folded for electrical connection with pin 19. Connector 29 can alternatively have a different form factor to reduce the number of folds in circuit board 26. Neutral pad 30 can be folded around insulator 17 for electrical connection with base 18. In this manner, circuit board 26 can be installed in the light without requiring separate electrical connectors or circuit boards, for example. Neutral pad 30 can also function to conduct heat from circuit board 26 to base 18 to help cool the light. Circuit board 26 can alternatively be implemented, at least in part, by a circular (rigid or non-folded) board with LEDs for placement on ridge 34.

The following are exemplary materials, components, and configurations for the solid state lights described herein.

The light sources can be implemented with LEDs, organic LEDs (OLEDS), or other solid state light sources. The lights can include one light source or multiple light sources. Also, the lights can use non-packaged LED light sources.

The driver circuit can be implemented with any circuit or component capable of receiving power from the power source and driving the light source based upon the received power.

The circuit board can be implemented with any flexible board capable of fitting within the light and supporting the driver circuit, light sources, and possibly other components. The circuit board can be, for example, a single flexible circuit board to house those components and make electrical connections for them. The circuit board can alternatively be implemented with rigid boards, or a combination of flexible and rigid boards.

The light section can be implemented with, for example, a metal material such as aluminum. The light section can also be implemented with other metal materials, ceramic materials, thermally conductive polymers, or combinations of such materials. The light section can function as a heat sink, and a size of the light section can be adjusted to dissipate a particular amount of heat from the light. The light section can have a round or circular shape, as shown, or other shapes depending upon the shape of the light guide, for example.

The base can be implemented with, for example, an Edison base for use with conventional light bulb sockets or a base configured for connection to other types of light fixture connections. Alternatively, the light could be configured as a luminaire without a fixture interface such as an Edison base.

The thermal guide is in sufficient contact, directly or indirectly, with the light sources in order to conduct and dissipate heat from the light sources. The thermal guide can be directly in physical contact with the light sources or indirectly in contact with them such as through other components. The thermal guide can be implemented with a metal material such as aluminum. The thermal guide can also be implemented with other metal materials, ceramic materials, thermally conductive polymers, or combinations of such materials. The thermal guide can be hollow, as shown, or composed of a solid material, and it can include a cylindrical post, as shown, or other have other shapes extending at least partially into the interior volume of the light guide. For example, the thermal guide can be shaped as a faux filament to resemble an incandescent light bulb or can have other decorative shapes or features. The thermal guide can optionally have a reflective coating.

The light guide can be implemented with, for example, a transparent or translucent material capable of receiving light from the one or more solid state light sources and emitting the light. For example, the light guide can be made of an optically suitable material such as acrylic, polycarbonate, polyacrylates such as polymethyl methacrylate, polystyrene, glass, or any number of different plastic materials having sufficiently high refractive indexes. The material can be cast or molded, for example, to form the light guide. The surfaces of the light guide can optionally be polished. The light guide can optionally include bulk scatter elements, such as particles within the light guide, to provide for a soft glow appearance when the light guide is illuminated by the solid state light sources.

The light guide can be composed of multiple portions adhered together with, for example, an adhesive or mechanical snap fit. The portions, when used, can be permanently adhered together or removably attached together. Alternatively, the light guide can be a single unitary piece of material. The light guide can have a bulb shape, as shown, or other shapes such as a sphere, cylinder, cube, cone, or other shapes creating an interior volume.

The light guide can optionally be tapered. The optional taper can include the light guide being fully tapered with a non-uniform thickness throughout the light guide or being partially tapered with a portion of the light guide having a non-uniform thickness and another portion having a uniform thickness. As an example, the light guide, or a portion of it, can become thinner in portions more distant from the light section.

The light guide can include optional coatings such as an ultraviolet (UV) coating on its outer surface. Furthermore, the light guide or thermal guide, or both, can include a matrix material that can contain light frequency shifting chromaphores to obtain a more desirable color rendering index, and examples of matrix stabilized dyes are described in U.S. Pat. No. 5,387,458, which is incorporated herein by reference as if fully set forth. Also, the light can include such a matrix material on any component where light from the light sources interacts with the matrix material.

The invention claimed is:

1. A light with integrated light and thermal guides, comprising:
   a light source;
   a light section having a first side and a second side opposite the first side;
   a light guide, coupled to the second side of the light section, comprising a material having a first surface and a second surface opposite the first surface and an edge between the first and second surfaces, wherein the second surface forms an enclosed interior volume, the light guide is in communication to the light source for receiving and distributing light from the light source, and the light is transported within the light guide until the light exits from the first or second surface, wherein the light source is located at the edge of the light guide in order to optically couple the light into the light guide at the edge; and a thermal guide at least partially contained within the interior volume and integrated with the light guide for providing thermal conduction from the light source for cooling the light, wherein an air gap is formed between at least a portion of the thermal guide and the second surface of the light guide, wherein the thermal guide is separable from the light section, the thermal guide has mechanical interference with the light guide in order to hold the light guide on the light section, and the mechanical interference comprises a portion of the thermal guide placed against the second surface of the light guide and holding the first surface of the light guide against a portion of the light section.

2. The light of claim 1, wherein the light source comprises one or more of the following: a light emitting diode; and an organic light emitting diode.

3. The light of claim 1, wherein there is no air gap between the light source and the edge of the light guide.

4. The light of claim 1, wherein the light guide includes light extraction features on the second surface.

5. The light of claim 1, wherein the light guide comprises a plurality of portions secured together.

6. The light of claim 1, further comprising a base coupled to the first side of the light section and configured for connection to a power source.

7. The light of claim 1, further comprising a reflective coating on the thermal guide.

8. The light of claim 1, wherein the enclosed interior volume is enclosed between the light guide and the light section.

9. The light of claim 1, wherein the air gap substantially surrounds the thermal guide between the thermal guide and the second surface of the light guide.

10. The light of claim 1, wherein the light section has no apertures between the first and second sides.

11. The light of claim 1, wherein the material of the light guide comprises polycarbonate.

12. The light of claim 1, further comprising a UV coating on the first surface of the light guide.

13. The light of claim 1, wherein the thermal guide includes a post extending into the interior volume.

14. The light of claim 1, further comprising a reflective film located at the second side of the light section adjacent the light source.

15. A light with integrated light and thermal guides, comprising:

a light source;

a base coupled configured for connection to a power source;

a light section having a first side coupled to the base and a second side opposite the first side;

a light guide, coupled to the second side of the light section, comprising a material having a first surface and a second surface opposite the first surface and an edge between the first and second surfaces, wherein the second surface forms an enclosed interior volume, the light guide is in communication to the light source for receiving and distributing light from the light source, and the light is transported within the light guide until the light exits from the first or second surface, wherein the light source is located at the edge of the light guide in order to optically couple the light into the light guide at the edge;

a thermal guide at least partially contained within the interior volume and integrated with the light guide for providing thermal conduction from the light source for cooling the light, wherein an air gap is formed between at least a portion of the thermal guide and the second surface of the light guide, wherein the thermal guide is separable from the light section, the thermal guide has mechanical interference with the light guide in order to hold the light guide on the light section, and the mechanical interference comprises a portion of the thermal guide placed against the second surface of the light guide and holding the first surface of the light guide against a portion of the light section;

a driver circuit for providing power to the light source; and a circuit board, wherein the driver circuit and the light source are mounted on the circuit board and the circuit board includes an electrical connection to the base.

16. The light of claim 15, wherein the enclosed interior volume is enclosed between the light guide and the light section.

17. The light of claim 15, wherein the air gap substantially surrounds the thermal guide between the thermal guide and the second surface of the light guide.

18. The light of claim 15, wherein the light section has no apertures between the first and second sides.

19. The light of claim 15, wherein the circuit board extends from the second side of the light section into an interior of the light section.

20. The light of claim 15, wherein the circuit board comprises a single flexible circuit board.

* * * * *